US012638347B2

(12) United States Patent
Park

(10) Patent No.: US 12,638,347 B2
(45) Date of Patent: May 26, 2026

(54) NANOSENSOR FOR FORCE SENSING, AND ASSOCIATED METHODS

(71) Applicant: THE REGENTS OF THE UNIVERSITY OF COLORADO, Denver, CO (US)

(72) Inventor: Wounjhang Park, Superior, CO (US)

(73) Assignee: THE REGENTS OF THE UNIVERSITY OF COLORADO, Denver, CO (US)

( * ) Notice: Subject to any disclaimer, the term of this patent is extended or adjusted under 35 U.S.C. 154(b) by 289 days.

(21) Appl. No.: 18/289,877

(22) PCT Filed: May 6, 2022

(86) PCT No.: PCT/US2022/028146
§ 371 (c)(1),
(2) Date: Nov. 7, 2023

(87) PCT Pub. No.: WO2022/236104
PCT Pub. Date: Nov. 10, 2022

(65) Prior Publication Data
US 2025/0012647 A1    Jan. 9, 2025

Related U.S. Application Data

(60) Provisional application No. 63/185,477, filed on May 7, 2021.

(51) Int. Cl.
*G01L 1/24* (2006.01)
*G01L 5/22* (2006.01)

(52) U.S. Cl.
CPC ..................................... *G01L 1/24* (2013.01)

(58) Field of Classification Search
CPC ... G01L 1/24; G01L 1/20; G01L 1/142; G01L 1/146; G01L 1/16; G01L 1/22; G01L 1/205; G01L 1/18; G01L 5/0047; G01L 1/2287; G02B 5/0816; G02B 1/002; G02B 26/001; G01N 27/3278; G01N 27/4141; H10N 30/302; H10N 30/20; H10N 30/506; G01P 15/0802; B81B 7/02; B81B 3/0018;
(Continued)

(56) References Cited

U.S. PATENT DOCUMENTS

| | | |
|---|---|---|
| 2012/0205553 A1 | 8/2012 | Agrawal et al. |
| 2015/0355040 A1 | 12/2015 | Sirbuly et al. |
| 2019/0049385 A1 | 2/2019 | Chou et al. |

OTHER PUBLICATIONS

PCT/US2022/028146 International Search Report and Written Opinion mailed Oct. 14, 2022, 11 pages.
(Continued)

*Primary Examiner* — Brandi N Hopkins
(74) *Attorney, Agent, or Firm* — Cozen O'Connor

(57) ABSTRACT

A nanosensor for detecting a force includes a metal layer, a flexible-material layer, and a photoluminescent material. The flexible-material layer is deposited on a top surface of the metal layer. The photoluminescent material is attached to, or at least partially embedded in the flexible-material layer and configured to emit first photoluminescence when optically excited at an excitation wavelength. The first photoluminescence has a first wavelength different from the excitation wavelength. The first intensity of the first photoluminescence changes with a distance between the photoluminescent material and the metal layer, where the distance changes in response to the force acting on the flexible-material layer.

19 Claims, 10 Drawing Sheets

(58) Field of Classification Search
CPC ..... B81B 3/0072; B81B 3/0021; B81B 3/001;
H01F 1/009; G01Q 30/10; G01Q 70/14;
G01Q 70/02; G06F 3/0414; G06F 3/0416;
G01K 3/04; G11B 9/02; H01L 29/66977;
H01H 13/70; C23C 14/3464; H02N
1/006; H02N 1/04; H01B 1/22; G03G
5/022; G01C 19/5769; B32B 3/08
USPC ................................................. 73/862.624
See application file for complete search history.

(56) References Cited

OTHER PUBLICATIONS

Alonso-Cristobal, P. et al. "Highly Sensitive DNA Sensor Based on Upconversion Nanoparticles and Graphene Oxide" ACS Appl. Mater. Interfaces Jun. 17, 2015;7(23): pp. 12422-12429.
Das, A. et al. "Enhancement of upconversion luminescence using photonic nanostructures" Nanophotonics published May 2020; 9 (6) pp. 1359-1371.
Das, A. et al. "Over 1000-fold enhancement of upconversion luminescence using water- dispersible metalinsulator-metal nanostructures" Nature Communications (Nov. 2018) 9:4828 11 pages.
Ince, R. et al. "Analysis of the performance of interferometry, surface plasmon resonance and luminescence as biosensors and chemosensors" Analytica Chimica Acta 569 (Mar. 2006) pp. 1-20.
Kumar, M. et al. "Highly Sensitive and Selective Label-Free Optical Detection of DNA Hybridization Based on Photon Upconverting Nanoparticles" Langmuir, Jun. 2009, 25(11), pp. 6024-6027.
Lu, D. et al. "Plasmon Enhancement Mechanism for the Upconversion Processes in $NaYF_4$: $Yb^{3+}$, $Er^{3+}$ Nanoparticles: Maxwell versus Förster" ACS Nano Jul. 2014, vol. 8, No. 8, pp. 7780-7792.
Mao, C. et al. "Enhanced Upconversion Luminescence by Two-Dimensional Photonic Crystal Structure" ACS Photonics, Jul. 2019, 6, pp. 1882-1888.
Wang, F. et al. "Direct Evidence of a Surface Quenching Effect on Size-Dependent Luminescence of Upconversion Nanoparticles" Angew. Chem. Int. Ed. Aug. 2010, 49, pp. 7456-7460.
Wei, R. et al. "Nile Red Derivative-Modified Nanostructure for Upconversion Luminescence Sensing and Intracellular Detection of $Fe^{3+}$ and MR Imaging" ACS Appl. Mater. Interfaces 2016, 8, Epub Dec. 24, 2015; pp. 400-410.
Würth, C. et al. "Quantum Yields, Surface Quenching, and Passivation Efficiency for Ultrasmall Core/Shell Upconverting Nanoparticles" J. Am. Chem. Soc. Mar. 2018, 140, 14, pp. 4922-4928.
Zhang, P. et al. "Design of a Highly Sensitive and Specific Nucleotide Sensor Based on Photon Upconverting Particles" J. Am. Chem. Soc. Aug. 2006, 128, pp. 12410-12411.
Zhao, L. et al. "Yolk-Shell Upconversion Nanocomposites for LRET Sensing of Cysteine/Homocysteine" ACS Appl Mater Interfaces Apr. 2014; 6(14): pp. 11190-11197.
Park, W. et al. "Plasmon enhancement of luminescence upconversion" Chem Soc Rev Apr. 2015, 44, pp. 2940-

200

100

204

202

303

366

305

368

372

364

362

360

301

NANOSENSOR FOR FORCE SENSING, AND ASSOCIATED METHODS

RELATED APPLICATIONS

This application is a 35 U.S.C. § 371 filing of International Application No. PCT/US2022/028146, filed on May 6, 2022, which claims priority to U.S. Provisional Patent Application No. 63/185,477, filed May 7, 2021. Each of these applications is incorporated herein by reference in its entirety.

STATEMENT REGARDING FEDERALLY SPONSORED RESEARCH OR DEVELOPMENT

This invention was made with government support under grant number CBET-2029559, awarded by the National Science Foundation, and grant number 1-R21-GM140347, awarded by the National Institutes of Health. The government has certain rights in the invention.

BACKGROUND

There are many applications in biological imaging where minimally invasive in vivo sensing of force and its distribution in biological tissues are highly desirable. Physical forces not only make critical contributions in determining the size and shape of organisms, but also play an important role in a wide variety of biological processes such as stem cell differentiation, initiation of transcriptional programs, morphogenesis, cell migration, malignancy, and wound healing. Precise in situ monitoring of internal stresses is also critical to applications like tissue implants, prosthetics and minimally invasive surgery.

SUMMARY

The present embodiments include a force nanosensor that uses a plasmonic nanostructure containing a layer of flexible material between the metal and luminescence materials. The metal layer selectively enhances one color of the luminescence emitted by the luminescent layer. When an external force is exerted on the nanosensor, the flexible material is compressed or stretched, changing the distance between the metal and luminescent layers and consequently varying the luminescence intensity. The nanosensor is also designed such that the metal layer minimally influences luminescence at a different wavelength. Thus, the intensity ratio of the two luminescence colors allows precise determination of the distance between the metal and luminescent layers. Since luminescence enhancement and quenching by the metal layer are both extremely short-range interactions, the luminescence signal is sensitive to displacements as small as 1 nm. With knowledge of the elasticity of the flexible material used in the sensor, the measured displacement is readily converted to local force.

In a first aspect, a nanosensor for detecting a force includes a metal layer, a flexible-material layer and a photoluminescent material. The flexible-material layer is deposited on a top surface of the metal layer. The photoluminescent material is attached to, or at least partially embedded in, the flexible-material layer and configured to emit first photoluminescence when optically excited at an excitation wavelength. The first photoluminescence has a first wavelength different from the excitation wavelength. The first intensity of the first photoluminescence changes with a distance between the photoluminescent material and the metal layer, where the distance changes in response to the force acting on the flexible-material layer.

In a second aspect, a force-sensing method includes optically exciting a photoluminescent material, measuring a first intensity of first photoluminescence emitted by the photoluminescent material, and determining a force exerted on the photoluminescent material. The photoluminescent material may be optically excited with excitation light at an excitation wavelength. The photoluminescent material may be attached to, or at least partially embedded in, a flexible-material layer that is deposited on a top surface of a metal layer. Measuring the first intensity of the first photoluminescence includes measuring a first intensity of the first photoluminescence emitted by the photoluminescent material at a first wavelength different from the excitation wavelength. Determining the force includes determining, based on the first intensity and an elasticity of the flexible material, a force exerted on the flexible material.

In a third aspect, a force-sensing method includes optically exciting a photoluminescent material, measuring the intensities of first and second photoluminescence emitted by the photoluminescent material, and determining a force exerted on the photoluminescent material. The photoluminescent material may be optically excited with excitation light at an excitation wavelength. The photoluminescent material may be attached to, or at least partially embedded in, a flexible-material layer that is deposited on a top surface of a metal layer. The intensity of the first photoluminescent is sensitive to the distance between the photoluminescent layer and the metal layer. Compared to the intensity of the first photoluminescence, the intensity of the second photoluminescence is less dependent on, or independent of, the distance between the photoluminescent layer and the metal layer. Determining the force includes determining, based on the intensity ratio of the first and second photoluminescence and an elasticity of the flexible material, a force exerted on the flexible material.

In a fourth aspect, a method for manufacturing a nanosensor includes depositing a metal layer on a silicon substrate, depositing a flexible-material layer on a top surface of the metal layer, and depositing a photoluminescent material on the flexible-material layer.

BRIEF DESCRIPTION OF THE FIGURES

FIGS. 3A-4C illustrate intermediate assemblies formed in a process of fabricating nanosensors, in embodiments.

DETAILED DESCRIPTION

Figure 1:
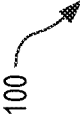
FIG. 1 is a perspective view of a nanosensor being used to optically detect a force, in an embodiment.

Despite the clear needs, currently available techniques for sensing forces in biological tissues are generally inadequate.

Traction microscopy, for example, cannot probe molecular-level force information and is prone to significant errors. Strain gauges and other electrical probes are highly invasive. Cantilevers and micro-resonators are fundamentally incompatible with in vivo force sensing. Fluorescence sensing with molecular probes allows force sensing at the subcellular level with high sensitivity. However, fluorescence-intensity-based sensing schemes require precise calibration, which is generally difficult and requires complex procedures and equipment.

Both up-conversion and down-conversion photoluminescence have attracted much attention for a variety of applications including photovoltaics and biological imaging. Photoluminescence in which luminescence photon energy is typically lower than the excitation photon energy and hence represents an energy down-conversion process, is widely used in imaging. A wide variety of luminescence probes such as organic dyes and quantum dots are available. Up-conversion nanoparticles (UCNPs) activated with lanthanide ions have attracted much attention for biomedical applications as they have excellent photostability, narrow emissions bands, and low cytotoxicity. Moreover, the use of near-infrared (NIR) excitation has numerous advantages compared to ultraviolet (UV) and visible light. UV and visible light, which are used in conventional fluorescence imaging, often excites background fluorescence from the surrounding tissue. In contrast, the NIR light does not excite background fluorescence and penetrates deep into tissues with minimal damages thanks to the high tissue transparency.

Metallic nanostructures supporting surface plasmon resonances exhibit strongly enhanced local electric fields in the vicinity of a metal surface. The high local fields lead to enhanced light-matter interaction resulting in stronger light scattering, absorption, and emission. In particular, plasmon enhancement of photoluminescence is of great interest to applications in imaging and sensing. Plasmon enhancement of photoluminescence, often referred to as the Purcell effect, arises from the increased photon density of states due to the plasmon resonance. The actual enhancement factor is determined by the combination of the Purcell effect and the unavoidable quenching by metals. In any case, since photoluminescence is a linear process, the plasmon-enhanced photoluminescence intensity is linearly proportional to the local intensity enhancement factor, which is determined by the details of the nanostructure geometry and materials used. In contrast, up-conversion is a nonlinear process and thus the plasmon enhancement is also nonlinear. In general, the luminescence intensity of an n-photon up-conversion process scales with the $n^{th}$ power of the excitation light intensity. Therefore, plasmon enhancement factor also scales with the $n^{th}$ power of the local intensity enhancement factor, potentially enabling a dramatic enhancement.

While enhanced luminescence intensity can generally enhance the sensing capability, intensity-based sensing faces a fundamental challenge in quantitative sensing. It is often difficult to control or measure the total number of luminescent probes, whether fluorescent dyes or nanoparticles, within the sensing volume. Therefore, fluorescence sensing can only give qualitative changes between samples. To make matters worse, luminescent probes may change their quantum efficiency due to the interaction with the environment. For example, a probe placed near a strongly absorbing material may exhibit significant luminescence quenching. For absolute measurements, a rigorous calibration process, which is often difficult to carry out, is needed.

Ratiometric sensing is a simple yet powerful technique that overcomes this difficulty. In ratiometric sensing, a luminescent probe with two or more emission wavelengths is used. Among the multiple emission lines, one is affected by the presence of the analyte, while others remain unchanged. The luminescence intensity unaffected by the analyte serves as the reference against which the analyte-sensitive luminescence intensity is calibrated. Advantageously, the intensity ratio does not depend on the number of probe molecules or nanoparticles in the sensing volume. Even in the presence of interaction with the environment that may affect the quantum efficiency, the ratio is preserved as long as the interaction has a weak wavelength dependence and thus affect the two intensities in the same way.

Lanthanide-doped luminescence materials, including UCNPs, are an excellent probe for ratiometric sensing since they exhibit multiple narrow-line photoluminescence peaks in the visible and NIR regions of the electromagnetic spectrum. Adding the benefits of ratiometric sensing to the well-established advantages of plasmon enhancement of up-conversion would lead to a powerful sensing platform. In particular, the highly selective enhancement of one photoluminescence color should provide greater sensitivity and wider dynamic range.

FIG. 1 is a perspective view of a nanosensor 100 being used to optically detect a force 114. The nanosensor 100 includes a metal layer 106 having a thickness 112 in the z direction (see right-handed coordinate system 120). Adjacent to the metal layer 106 is a flexible-material layer 104 having a thickness distance 110 in the z direction. The nanosensor 100 also includes a photoluminescent material attached to or at least partially embedded in the flexible-material layer 104. In the example of FIG. 1, the photoluminescent material is a plurality of UCNPs 102. However, the photoluminescent material may alternatively be fluorophores embedded in a matrix, a slab of a semiconductor nanocrystal, or another type of material that generates photoluminescence. The photoluminescent material may also implement down-conversion, or a combination of up-conversion and down-conversion, without departing from the scope hereof. The metal layer 106 and flexible-material layer 104 are shown in FIG. 1 as being disk-shaped with a diameter 116 in the x-y plane. However, the metal layer 106 and flexible-material layer 104 may have other shapes, such as a regular polygon, irregular polygon, oval, etc.

When the UCNPs 102 are excited by near infrared (NIR) laser light 118, they emit multi-band light of shorter wavelengths than an excitation wavelength of the laser light 118. This phenomenon is caused by a photon up-conversion process where two or more photons of the laser light 118 are absorbed by a UCNP 102, resulting in emission of a single photon of higher energy than that of the individual absorbed photons. The up-conversion may occur at multiple emitted wavelengths, depending on the chemical composition of the UCNPs 102. In some embodiments, the UCNPs 102 are composed of $NaYF_4:Yb^{3+}$, $Er^{3+}$ (Yb—Er). Other types of materials and different composition levels may be used for the UCNPs 102 without departing from the scope hereof. For example, $NaYF_4:Yb^{3+}$, $Tm^{3+}$ (Yb—Tm) or another rare-earth-metal-based composite material may be used. In an embodiment, the UCNPs 102 are synthesized such that upon excitation by the laser light 118, red photoluminescence 122 and green photoluminescence 124 are emitted. However, the emitted photoluminescence wavelengths may be other than red and green, or the UCNPs 102 may emit at more than two wavelengths, without departing from the scope hereof.

The metal layer 106 is placed at a distance 110, set by the flexible-material layer 104, near the UCNPs 102. The metal layer 106 enhances (i.e., increases the intensity) the red photoluminescence 122 while leaving the green photoluminescence 124 either unchanged or slightly quenched. Photoluminescence enhancement is based on a surface plasmon resonance occurring when the electron oscillations in the metal layer 106 are excited by a specific wavelength of incident light, leading to increasing local electric fields at the top surface of metal layer 106. The resultant enhancement of luminescence is known as Purcell effect. The Purcell factor is used as a measure of the luminescence enhancement due to this plasmon resonance. These higher local electric fields enhance light-matter interaction resulting in increase of light emission. The material and geometry (i.e., shape and dimensions) of the metal layer 106 enable only red photoluminescence 122 to be enhanced by the plasmon resonance. The Purcell factor, and thus the intensity of the red photoluminescence 122, is a function of the distance 110, while the intensity of the green photoluminescence 124 is slightly quenched. When the distance 110 decreases, the intensity of the red photoluminescence 122 increases while the intensity of the green photoluminescence 124 remains unchanged or slightly decreases. On the other hand, when the distance 110 increases, the intensity of the red photoluminescence 122 decreases while the intensity of the green photoluminescence 124 remains unchanged or slightly increases. In some embodiments, when the distance 110 is ~40 nm, the plasmon resonance causes the intensity of the red photoluminescence 122 to increase by a factor of approximately 1.5. The intensity of the red photoluminescence 122 gradually increases with decreasing distance 110. In the nanosensor 100, the red photoluminescence intensity enhancement factor reaches ~4 when the distance 110 drops to 10 nm. Without departing from the scope hereof, other wavelengths than red may be enhanced and the intensity enhancement factors may be different from that of the embodiment in FIG. 1.

For a given value of the distance 110, the ratio of the intensity of the red photoluminescence 122 to the intensity of the green photoluminescence 124 is constant and independent of the number of UCNPs 102 used in the nanosensor 100, the intensity of the laser light 118, and the shape of the nanosensor 100. This red-to-green (R/G) intensity ratio is therefore a function of the distance 110 only.

When the force 114 is applied normal to the top surface of the flexible-material layer 104, as shown in FIG. 1, the flexible-material layer 104 is compressed in the direction of the force 114 and by a distance that is proportional to the applied force 114 by the elasticity of the flexible-material layer 104. The elasticity of the flexible material of the layer 104 (e.g., Young's modulus, bulk modulus, etc.) may be already known or directly measured, for example, by nanoindentation. With the known or measured elasticity modulus of the flexible material, a value of the distance 110 can be directly mapped to a magnitude of the force 114.

High-conductivity metal in the metal layer 106 selectively enhances the intensity of the red photoluminescence 122 as a function of distance 110 without affecting that of the green photoluminescence 124. Therefore, the distance 110 corresponds to a specific value of the R/G intensity ratio. As the elasticity modulus of the flexible-material layer 104 maps the distance 110 to the force 114, the R/G intensity ratio is, therefore, a function of the force 114.

Both the plasmon resonance wavelength and Purcell factor vary with the material type and geometry of the metal layer 106. For example, when the diameter 116 is 230 nm, the thickness 112 is 15 nm, and the distance 110 is 10 nm, the plasmon resonance wavelength is 654 nm and the Purcell factor is ~4. When the diameter 116 is changed to 190 nm, and thickness 112 is 30 nm, for the same distance 110 of 10 nm, the plasmon resonance wavelength shifts to 810 nm, far from both red and green emission bands and the resulting Purcell factor becomes nearly constant for wavelengths below 700 nm. The latter nanostructure, for practical purposes, therefore, provides no change in the R/G intensity ratio with changing distance 110.

The photoluminescent material used for the nanosensor 100 may alternatively or additionally implement down-conversion. For example, the photoluminescent material may down-convert the laser light 118 to emit infrared photoluminescence in the window between 1,000 nm and 1,700 nm. This infrared window is especially attractive for in vivo biological imaging with sub-centimeter tissue penetration. $Er^{3+}$-based nanoparticles, for example, can emit down-converted photoluminescence between 1,500 nm and 1,700 nm. Imaging in this wavelength range reduces both light scattering and auto-fluorescence background, and therefore may be advantageous over up-converted photoluminescence in the near infrared and visible. In addition, some types of photodetectors have a greater quantum efficiency at infrared wavelengths, as compared to visible wavelengths. For down-conversion, the wavelength of the laser light 118 is smaller (i.e., higher energy) than the one or more wavelengths emitted photoluminescent material. The plasmon resonance may be tuned to enhance one of these down-converted emission wavelengths. As in the case of up-conversion, the ratio of the photoluminescence intensity at the enhanced wavelength to that at a different wavelength can be used to determine of the force 114.

The ratio of the intensity of the plasmon-enhanced wavelength may alternatively or additionally be normalized to the intensity of the incident laser light 118. The intensity of the laser light 118 may be directly measured, for example, by a probe other than the nanosensor 100, such as an inverse gas chromatography probe or infrared fluorescent dyes.

Examples of materials that may be used for the flexible-material layer 104 include, but are not limited to, polyisoprene, polybutadience, polychloroprene, polydimethyl siloxane, polyacrylate elastomers, and polyethylene. The photoluminescent material may include a host and dopants. Examples of the host include, but are not limited to, $Y_2O_3$, $Al_2O_3$, YOCl, $BaCl_2$, $BaY_2F_4$, $AlF_3$, $ZrF_3$, $YF_3$, $NaYF_4$, and $NaGdF_4$. Examples of the dopant include, but are not limited to, Yb, Er, Eu, Tb, Ce, Pr, Nd, Gd, Sm, Dy, Ho, and Tm.

Figure 2:
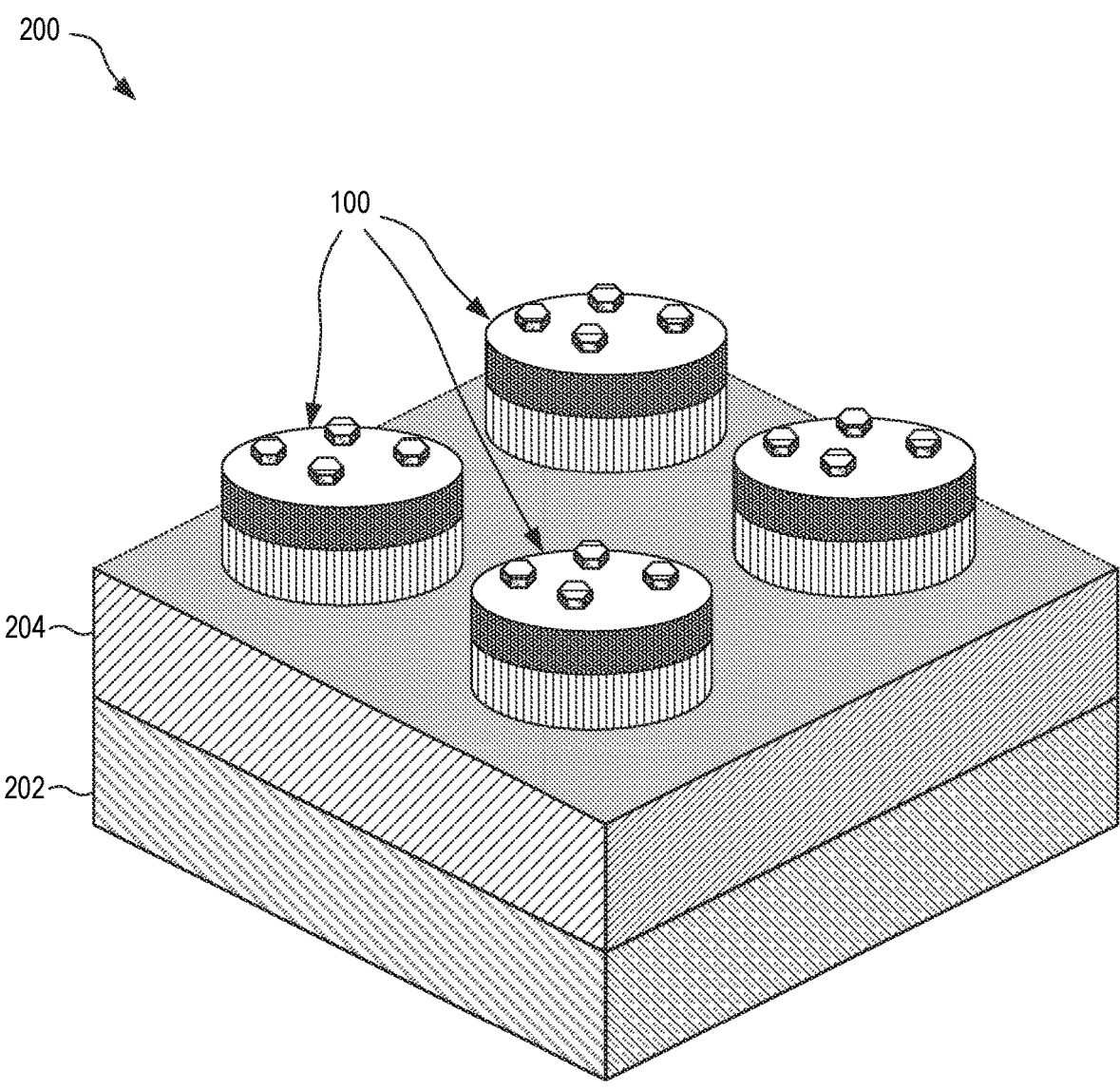
FIG. 2 is a perspective view of a nanosensor array that includes several of the nanosensor of FIG. 1, in an embodiment.

FIG. 2 is a perspective view of a nanosensor array 200 that includes several of the nanosensor 100 of FIG. 1. While FIG. 2 shows only four nanosensors 100, the nanosensor array 200 may have a different number of nanosensors 100 without departing from the scope. The dimensions of the nanosensor array 200, and its geometry, represent a final stage in the process of multiple identical sensors 100 fabrication. The array 200 includes a layer 204 deposited or grown on a substrate 202. For example, the substrate 202 may be a silicon wafer, and the layer 204 may be a 6-μm thick layer of silica thermally grown on the silicon wafer. Laser interference lithography (LIL) may be performed during nanosensor fabrication. Depending on the force measurement application several options will be considered. For some force measurement applications that require mobility or prefer small size, the individual sensors 100 may be separated from layer 204 and delivered individually to the desired locations for force sensing. For measurements of force distribution over larger areas, such as forces acting on a skin tissue or surface of a larger organ, evenly distributed sensors in a form of the nanosensor array 200 provides a solution.

Figures 3A, 3B, 3C:
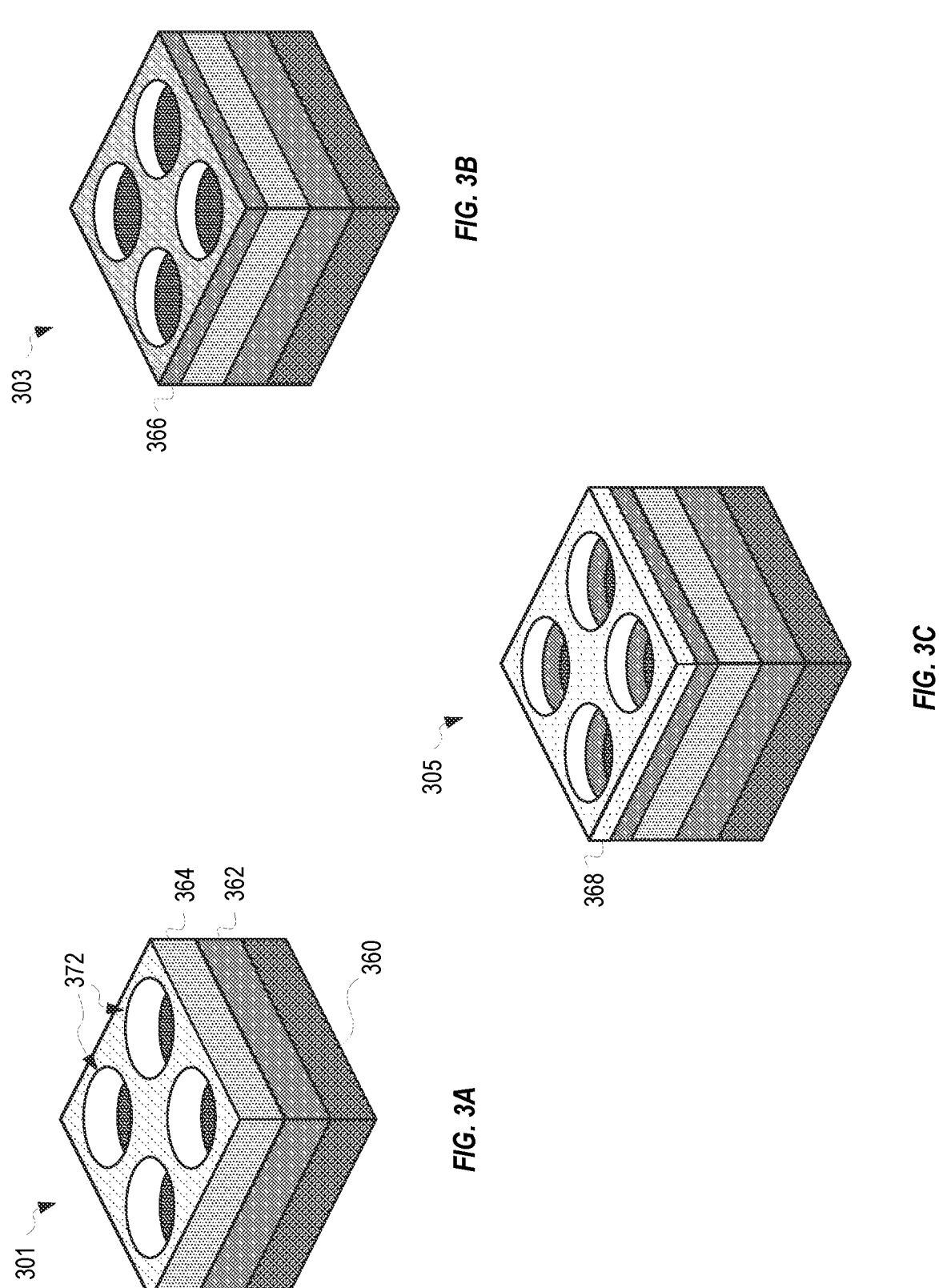

FIGS. 3A-4C illustrate intermediate assemblies 301, 303, 305, 307, 309, and 311 formed in a process of fabricating plasmonic nanostructures, such as the nanosensor array 200 of FIG. 2. FIG. 3A is a perspective view of an intermediate assembly 301. Intermediate assembly 301 includes a layer 362 deposited or grown on a substrate 360. The substrate 360 may be a silicon wafer, and the layer 362 may be a layer of silica. In an example, the layer 362 is thermally grown to a thickness of six micrometers on silicon wafer substrate 360. A photoresist layer 364 is then spin-coated on the layer 362. An array of holes 372 may then be formed using, for example, LIL. In an example, the array of holes 372 have a period of 600 nm.

Intermediate assembly 303 in FIG. 3B builds on the intermediate assembly 301 by adding a metal layer 366. The metal layer 366 may be a gold layer of 15 nm deposited using thermal evaporation. The metal layer 366 may also be one of gold, silver, copper, platinum, aluminum, or a combination thereof and may have a different thickness without departing from the scope. Intermediate assembly 305 in FIG. 3C builds on the intermediate assembly 303 by adding a flexible-material layer 368. The flexible-material layer 368 is a spacer layer that is transparent in the visible range. For example, the flexible-material layer 368 may be a flexible polymer layer such as, but not limited to, polyisoprene, polybutadiene, polychloroprene, polydimethyl siloxane, polyacrylate elastomers, and polyethylene and may be deposited by spin-coating on top of the metal layer 366.

Figures 4A, 4B, 4C:
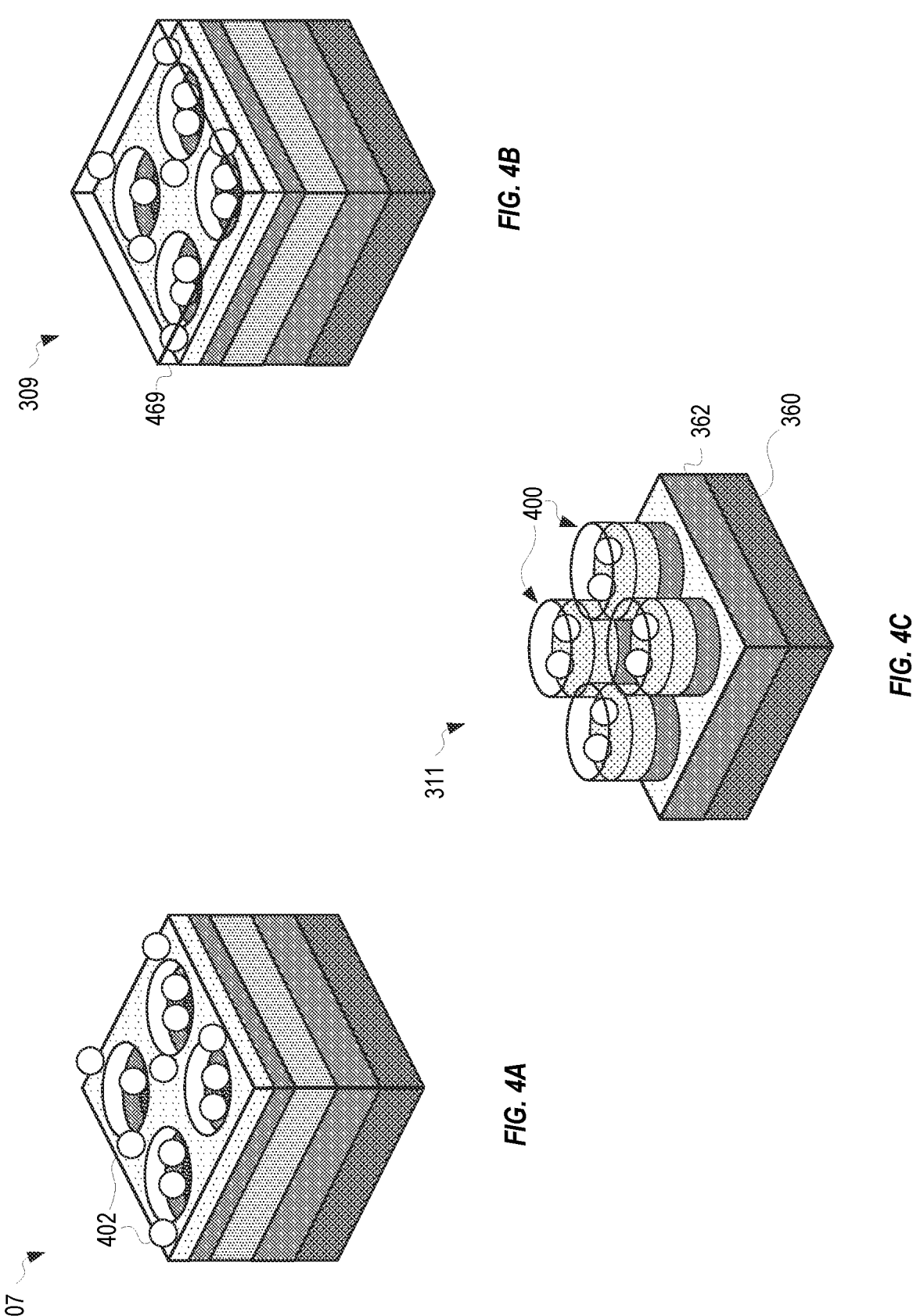

Intermediate assembly 307 in FIG. 4A builds on the intermediate assembly 305 by adding a photoluminescent material 402. The photoluminescent material 402 may be a plurality of UCNPs (e.g., UCNP 102 of FIG. 1), and may be synthesized using thermal decomposition method. In an example of synthesizing Yb—Er UCNP, compounds $YCl_3$, $GdCl_3$, $YbCl_3$, and $ErCl_3$ are mixed in respective masses of 43.0, 26.4, 20.1, and 2.2 milligrams in a solution comprising 3 mL of oleic acid and 7 mL of 1-octadecene. Gd ions are used for controlling the nanoparticle diameter while the relative amount of surfactant influenced the nanoparticle aspect ratio. The mixture is heated to 160° C. for 10 minutes before being cooled to room temperature to form a homogenous solution. The homogenous solution is mixed with methanol solution, which is prepared by dissolving 40.0 mg of NaOH and 59.3 mg of $NH_4F$ in 20 mL of methanol. The mixture is then heated to 100° C. under a flow of argon for 25 minutes before being purged, after which the mixture is sealed in a reaction vessel and heated to 300° C. for an hour. The resulting mixture is slowly cooled to room temperature and washed using 200 proof ethanol. Nanoparticles are then collected after centrifuging the washed mixture at 7000 rpm for 10 minutes and drying in an oven. These steps may be repeated to obtain desired nanoparticles, which are then dispersed in toluene. In an embodiment, the UCNP concentration is adjusted to 250 µg/mL to achieve a monolayer. Different composition levels or variations of thermal decomposition method may be used for synthesizing UCNPs without departing from the scope. Other types of photoluminescent materials may also be used for UCNP. In this example, UCNPs are deposited on the intermediate assembly 305 by drying the UCNP solution in a confinement cell.

Intermediate assembly 309 in FIG. 4B builds on the intermediate assembly 307 by adding a layer 469. The layer 469 is used to keep UCNPs affixed in the intermediate assembly 307. For example, the layer 469 may be a sputtered layer of 10 nm thick indium tin oxide (ITO) overlayer covering the photoluminescent material 402 on the intermediate assembly 307. Intermediate assembly 311 in FIG. 4C isolates plasmonic nanostructures from the intermediate assembly 309 by removing the photoresist layer 364. For example, the photoresist layer 364 may be removed by immersing the intermediate assembly 309 in acetone with sonication. The remaining intermediate assembly 311 includes an array of nanosensors 400 on top of the layer 362. The array of nanosensors 400 is an example of the nanosensor array 200. Water-soluble polymer, such as polyvinyl alcohol (PVA), may be applied over the nanosensor array to detach each nanosensor from the layer 362. Each nanosensor is an example of the nanosensor 100 of FIG. 1. Subsequently dissolving the water-soluble polymer in water disperses the nanosensors 400 in water, making them suitable for desired applications, such as biological experiments.

Figure 5:
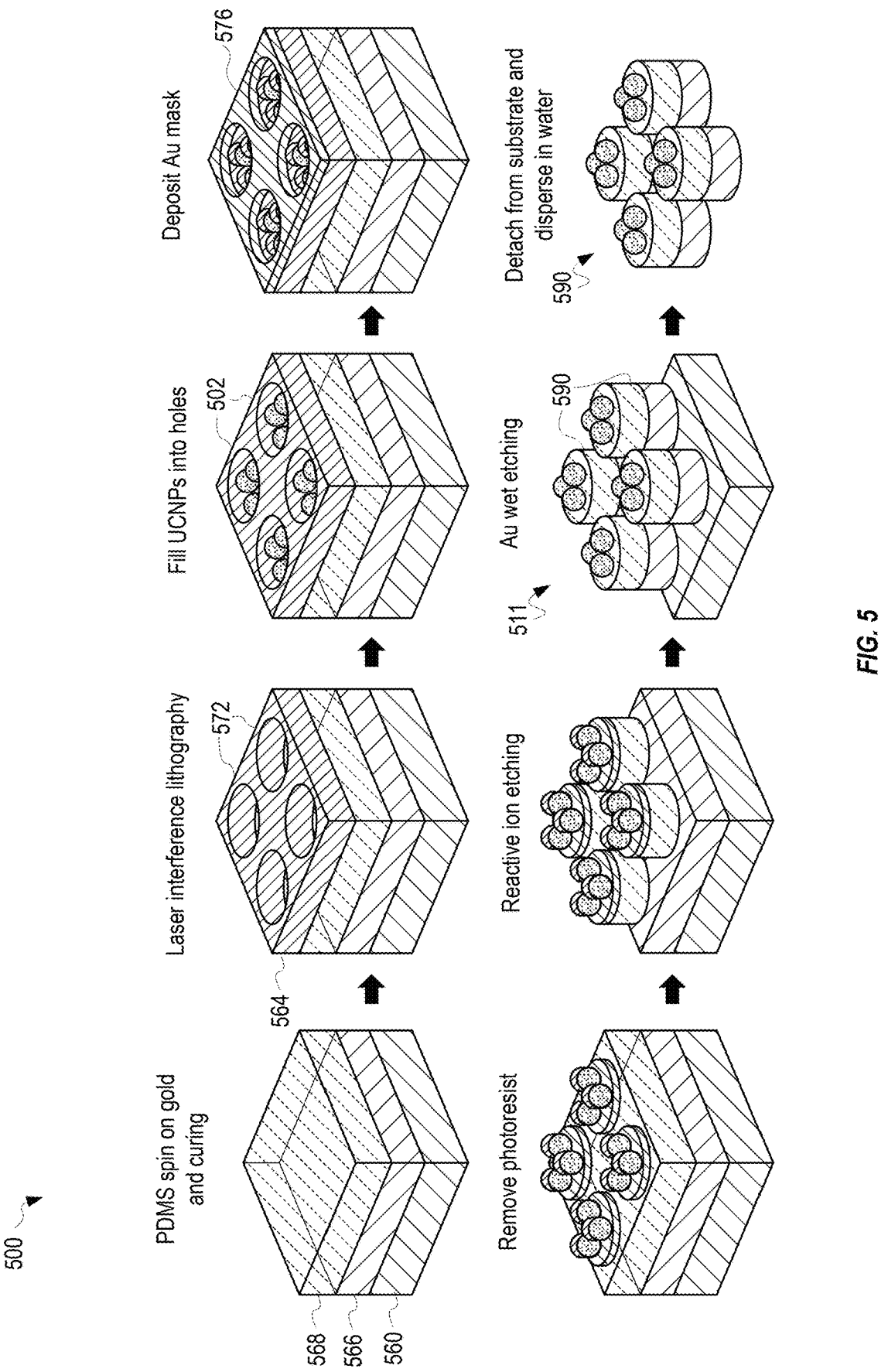
FIG. 5 illustrates an alternate process for fabricating nanosensors, in an embodiment.

Variations in fabrication process may be introduced to enhance absorption at the excitation wavelength, which may result in enhancement of up-conversion luminescence. An example variation in fabrication process is shown in FIG. 5, which illustrates a process 500 for fabricating nanosensors that is an alternative to the method described above for FIGS. 3A-4C. The process 500 includes deposition of a metal layer 566 and a flexible-material layer 568 on a silicon substrate 560. The metal layer 566 and the flexible-material layer 568 are respective examples of the metal layer 366 and the flexible-material layer 368. The metal layer 566 may be a gold layer. The flexible-material layer 568 may be a layer of polydimethylsiloxane (PDMS). LIL is performed after spin-coating a photoresist layer 564 to produce an array of nanoholes 572, which are then filled with UCNPs 502. A mask layer 576 is then deposited as an etch mask layer. The mask layer 576 may be a gold layer. Reactive-ion etching removes the flexible-material layer 568 leaving the structures in the nanoholes 572 intact. Wet etching of the mask layer 576 is then performed to remove the etch mask and leave an intermediate assembly 511. The intermediate assembly 511 is an example of the intermediate assembly 311 and the nanosensor array 200 in FIG. 2. The intermediate assembly 511 includes nanosensors 590 on the silicon substrate 560. The nanosensors 590 may be detached from the silicon substrate 560 using water-soluble polymer and dispersed in water for usage.

Figure 6:
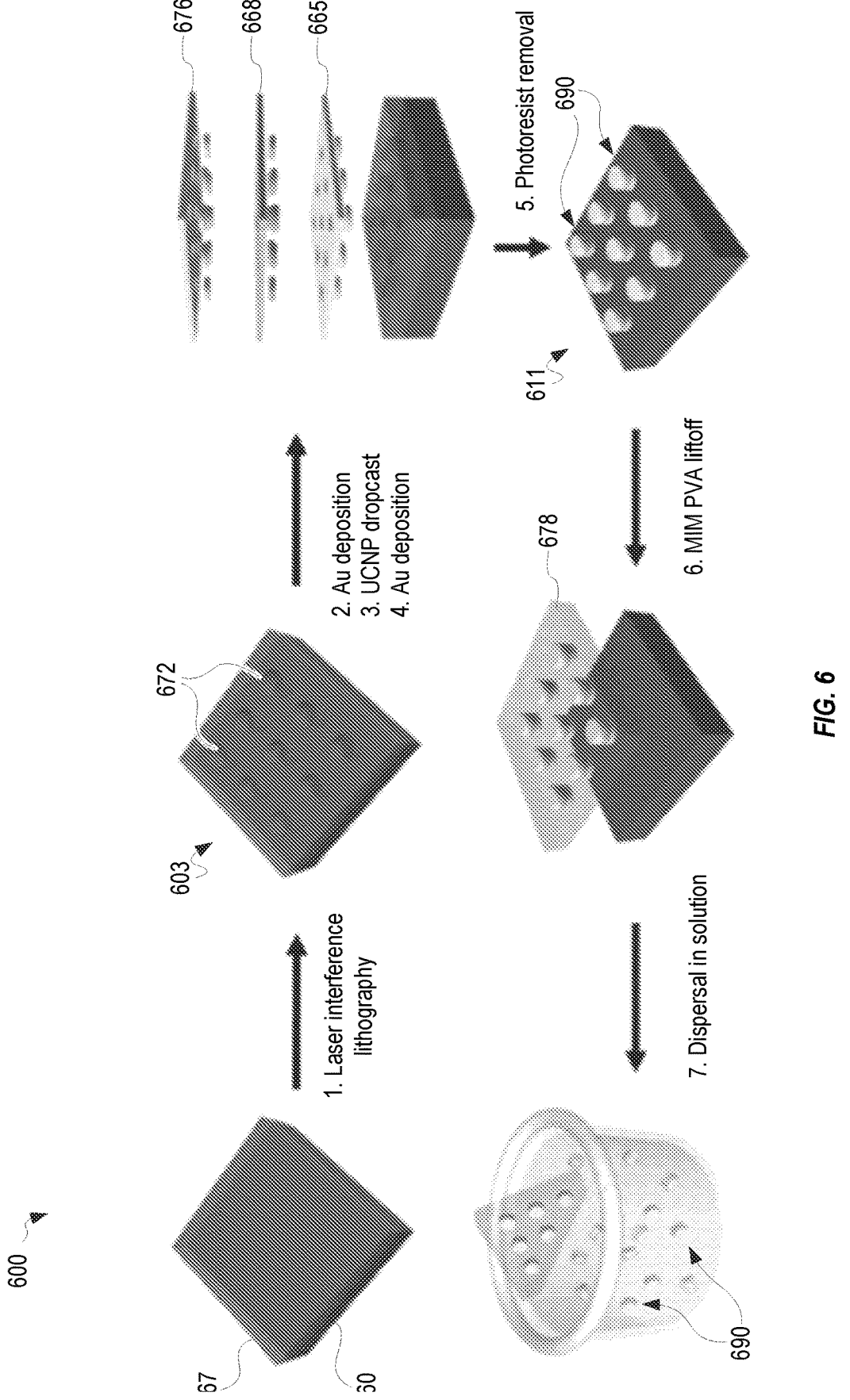
FIG. 6 illustrates a fabrication process for fabricating nanosensors having metal-insulator-metal structure, in an embodiment.

Additionally, nanostructures that may be a part of a nanosensor, may have an alternate structure, such as metal-insulator-metal (MIM) structure. FIG. 6 illustrates a fabrication process 600 for fabricating nanostructure 690 having the MIM structure. The fabrication process 600 includes depositing a photoresist layer 667 on a silicon substrate 660. The photoresist layer 667 and the silicon substrate 660 are respective examples of the photoresist layer 564 and the silicon substrate 560. In an intermediate assembly 603, an array of nanoholes 672 is created using LIL. On the intermediate assembly 603, a first metal layer 665, an UCNP monolayer 668, and a second metal layer 676 are deposited in sequence. The metal layers 665 and 676, which may be gold layers, are examples of the metal layer 366. The metal layers 665 and 676 may be deposited by using thermal evaporation method. The UCNP monolayer 668 may be synthesized by thermal decomposition method. For the nanostructure 690 to be a nanosensor, such as nanosensor 100 of FIG. 1, a flexible-material layer, such as the flexible-material layer 568 may be deposited between the UCNP monolayer 668 and one or both of the metal layers 665 and 676. Subsequent removal of the photoresist layer 667 results in an intermediate assembly 611. The intermediate assembly

611, which is an example of the intermediate assembly 311 and the nanosensor array 200, includes an array of nanostructures 690 on the silicon substrate 660. The nanostructures 690, which have a MIM structure, may be detached from the silicon substrate 660 using water-soluble polymer, such as PVA 678, and dispersed in water.

Nanosensors fabricated using methods described above are highly uniform nanostructures, which produce a consistent, narrowband resonance with minimal inhomogeneous broadening, which is further reduced by enhancing (i.e., increases the intensity) the red photoluminescence while leaving the green photoluminescence either unchanged or slightly quenched. In contrast, any non-uniformity introduced during the fabrication process of nanosensors may result in enhancing green photoluminescence as well, thereby increasing the inhomogeneous broadening and deteriorating the sensor performance.

Improvements to the performance of nanostructures may be made by carefully selecting the material used for each component of the nanosensor. For example, a further enhancement may be achieved by selecting silver as the material for a metal layer, such as the metal layer 106 in FIG. 1. As silver is expected to have a lower absorption loss than gold, a silver nanodisk may result in a higher local field enhancement, thereby increasing the red-to-green ratio. Silver, however, may be prone to degradation from oxidation, which may be addressed by encapsulating the nanostructure with an inert coating.

Additionally, in the process of depositing the metal layer, direct deposition of gold on an inorganic substrate may result in an island-like growth due to the poor wetting of gold and may lead to highly granular film with significant roughness. An addition of a suitable adhesion layer such as titanium or chromium may improve the deposition quality. The adhesion layer, however, may introduce additional optical losses and significantly deteriorate the optical properties. In such an example, a layer comprised of one of germanium, copper, and organosilanes may help to produce ultrasmooth gold or silver films without negatively affecting the optical properties.

In another example, the composition of UCNP may be $NaYF_4:Yb^{3+}, Tm^{3+}$ (Yb—Tm) instead of Yb—Er. While the Yb—Er UCNP primarily emits two colors: green and red, the Yb—Tm UCNP emits multiple luminescence lines: ultraviolet (UV), blue, red, and near-infrared (NIR) at respective wavelengths of 350, 370, 650, and 800 nm. The presence of multiple emission lines may present a higher degree of freedom in designing force sensor based on selective enhancement and quenching of luminescence. For example, NIR emission at 800 nm may be used for plasmon enhancement while the intensity ratio of red and NIR emissions is used as the signal. Advantageously, in the NIR region, both gold and silver nanodisks result in less loss than in the visible range and offer greater enhancement, thereby improving the sensor performance. Additionally, both 800 nm and 650 nm emissions exhibit better transmission through biological tissues and suffer less scattering loss than shorter wavelengths. Consequently, these advantages may lead to a better force sensor with potentially higher sensitivity, greater signal-to-noise ratio and deeper tissue penetration than a sensor based on Yb—Er UCNP. However, Yb—Tm UCNP has a lower up-conversion efficiency when compared to Yb—Er UCNP, partly because the up-conversion in Yb—Tm UCNP is a three-photon process as opposed to a two-photon up-conversion in Yb—Er UCNP.

Further improvements may also be made in flexible-material layer, such as the flexible-material layer 368. For example, material with a lower elastic modulus may be used for the flexible-material layer. Among flexible polymers, PDMS has a low elastic modulus and is biocompatible. The elastic modulus may also be engineered by adjusting the preparation conditions such as its composition and curing temperatures.

Figures 7A, 7B, 7C:
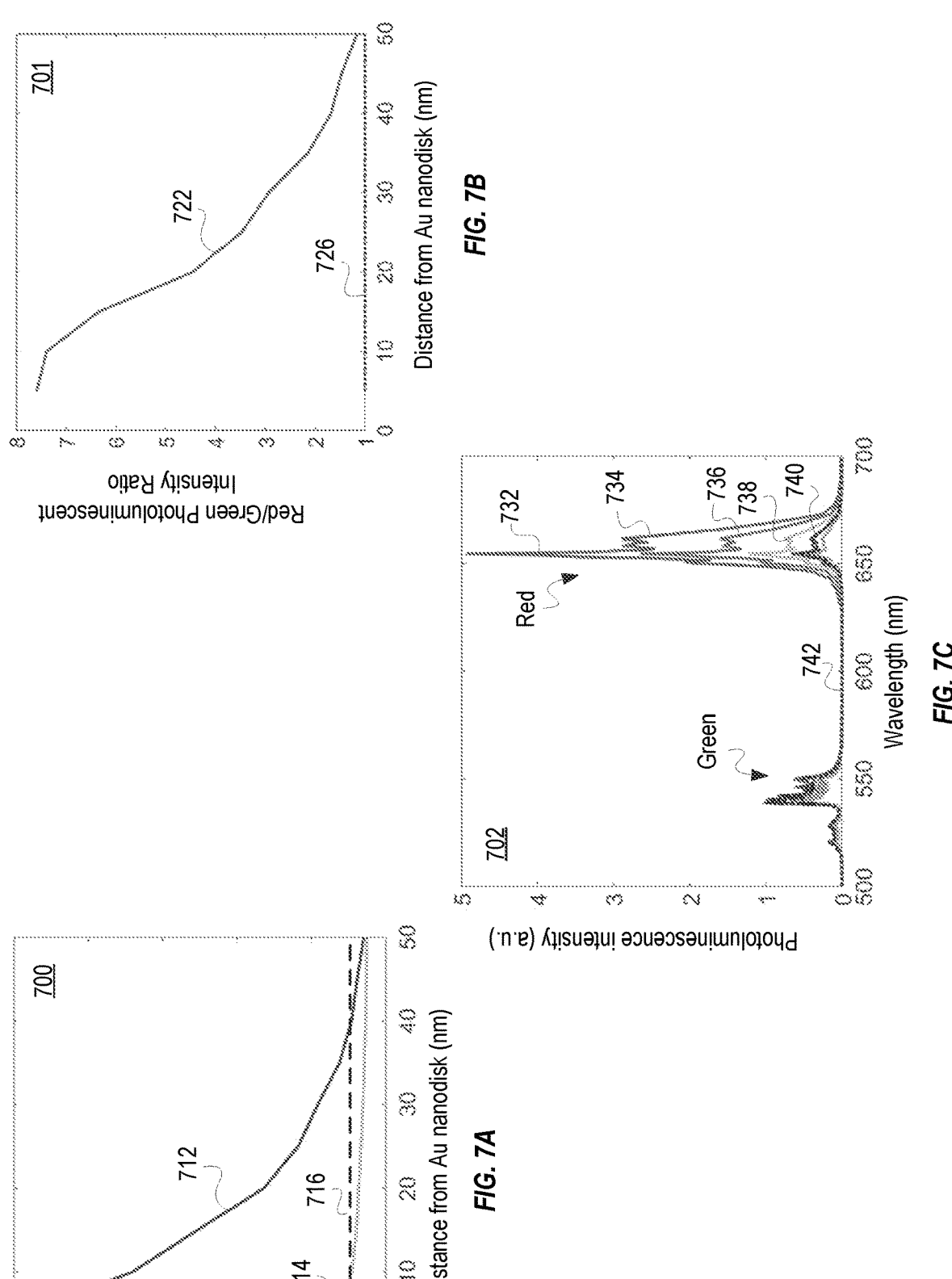
FIGS. 7A, 7B, and 7C show results of a simulated nanosensor with a gold nanodisk and Yb—Er up-conversion nanoparticles, in an embodiment.

Additionally, geometrical dimensions of the flexible-material layer and the metal layer are critical to the performance of the nanosensors. For example, FIGS. 7A and 7B show results of a simulated nanosensor with a gold nanodisk and Yb—Er UCNP. The simulated nanosensor is an example of the nanosensor 100. The simulated gold nanodisk was 15 nm thick and had a diameter of 100 nm. The local field enhancement from surface plasmon resonance was at the red luminescence wavelength (i.e., ~650 nm). Resulting enhancement of red emission is shown in an intensity plot 700 in FIG. 7A. The intensity plot 700 shows emission intensity as a function of distance from the gold nanodisk to the UCNP in nanometers. The intensity plot 700 includes a red emission trace 712, a green emission trace 714, and a reference trace 716. The reference trace 716 shows the calculated intensity when the distance from the gold nanodisk is at an infinite distance away. The intensity plot 700 shows a large enhancement of the red emission trace 712, while little enhancement or slight quenching is shown for the green emission trace 714.

FIG. 7B is an intensity ratio plot 701 of the red-to-green photoluminescent emissions as a function of the distance (in nanometers) from the gold nanodisk to the UCNP. The intensity ratio plot 701 includes a R/G ratio trace 722 and a reference trace 726. The R/G ratio trace 722 is the ratio of the red emission trace 712 to the green emission trace 714 of FIG. 7A. In the design of the simulated nanosensor, the R/G ratio increases by more than a factor of seven as the distance from the gold surface is decreased from 50 nm to 5 nm. The ratio factor is in comparison to the reference trace 726, which is the R/G ratio calculated for an infinitely far distance from the gold surface. In the calculations, the enhancement and quenching factors for dipoles with three independent polarizations were distributed over the volume occupied by 18-nm UCNPs. As such, these results of the simulation represent a realistic case.

FIG. 7C shows a simulated photoluminescence intensity spectrum plot 702 for various distances from the gold nanodisk. The intensity spectrum plot 702 includes traces for distances of 5 nm, 15 nm, 25 nm, 35 nm, and 45 nm as traces 732, 734, 736, 738, and 740, respectively. The intensity spectrum plot 702 also includes a reference trace 742, which is calculated for a distance at an infinite distance. The intensity spectrum plot 702 shows that differential enhancements of red and green luminescence are highly sensitive to the distance from metal surface, leading to significant changes in the R/G intensity ratio. This strong distance dependence is the basis for the force sensing nanosensor. Therefore, the sensitivity of the nanosensor is dependent on the thickness of the flexible-material layer.

Characterization of the fabricated nanosensors may be performed to evaluate and calibrate the nanosensor. The measurements including elastic modulus of the flexible-material layer (e.g., the flexible-material layer 104 in FIG. 1) and photoluminescence of the nanosensor may be used for calibrating the nanosensor. The elastic modulus of the flexible-material layer may be characterized using a nanoindenter. In general, the elastic modulus of a flexible-material layer depends on, but is not limited to, material choice, the layer thickness (e.g. the thickness distance 110 of FIG. 1), and the fabrication method (e.g., curing conditions and choice of solvent). As such, a direct measurement of elastic modulus using a nanoindenter eliminates uncertainties on elastic modulus and allows for a precise determination of force.

Photoluminescent measurement may be performed on a nanosensor array (e.g., the nanosensor array 200 of FIG. 2) before dispersing the nanosensors in water. This measurement yields the force-luminescence relation that may be used to extract force information. The photoluminescent measurement requires (i) a highly controlled method of exerting a known force on the nanosensors, and (ii) a calculational model to relate the strained nanosensor to the applied force. For requirement (i), the nanosensor array is compressed using a high precision translation stage, while the array is monitored using an optical microscope. Most of the commonly available motorized translation stages have a minimum translation resolution of 100 nm and cannot produce small deformations (down to 1 nm) needed to mimic the in vivo situations. To address this issue, an additional load bearing layer may be added to the nanosensor array. For example, a thick layer of a load-bearing flexible-material layer, such as a PDMS layer, may be deposited on top of the nanosensor array, such that the load-bearing flexible-material layer may distribute the applied strains and lead to deformation as small as 1 nm in the sensor layer. Additionally, a rigid glass slide may be added between the load-bearing flexible-material layer and the sensor array to prevent any complex, non-uniform deformation.

Experimental Demonstration

For experimental verification of the proposed sensor concept, sample nanosensors were prepared on a $SiO_2$ substrate. In this experimental verification, in order to verify the relationship between the luminescence intensity ratio and the thickness of the flexible-material layer, an inflexible layer of ITO is used in place of the flexible-material layer. The resulting inflexible structures and incomplete nanosensors with missing parts are referred to as "sample nanosensors" for the verification process but are not functional sensors. The sample nanosensors were fabricated following the method described above for fabricating the intermediate assembly 311 in FIG. 4C and are an example of the nanosensor array 200 in FIG. 2. Several structures were prepared with the following configurations: (i) a UCNP layer on a $SiO_2$ substrate, (ii) a UCNP layer on a gold nanodisk without a flexible-material or an ITO layer, (iii) a UCNP layer on a 20-nm thick ITO layer without a gold nanodisk, (iv) a UCNP layer, a 10-nm thick ITO layer, and a gold nanodisk, and (v) a UCNP layer, a 20-nm thick ITO layer, and a gold nanodisk. The experimental setup included a confocal laser scanning microscope, a spectrometer, a laser, and a photodetector. The photoluminescence (PL) spectroscopy was performed using the confocal laser scanning microscope coupled with the spectrometer. The sample nanosensors were excited with a 980 nm wavelength laser with 300 mW of power. The emission from the UCNPs was collected by a silicon CCD detector.

Figure 8B:
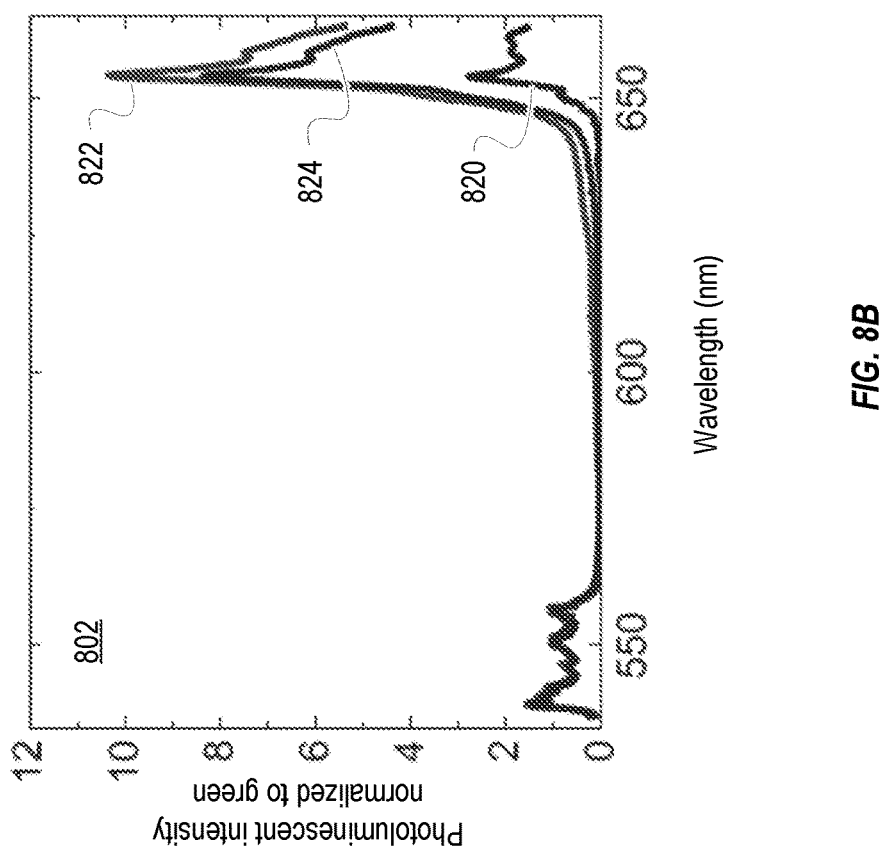
FIGS. 8A, 8B, and 9 are plots showing the measurement results of sample nanosensors.
Figure 8A:
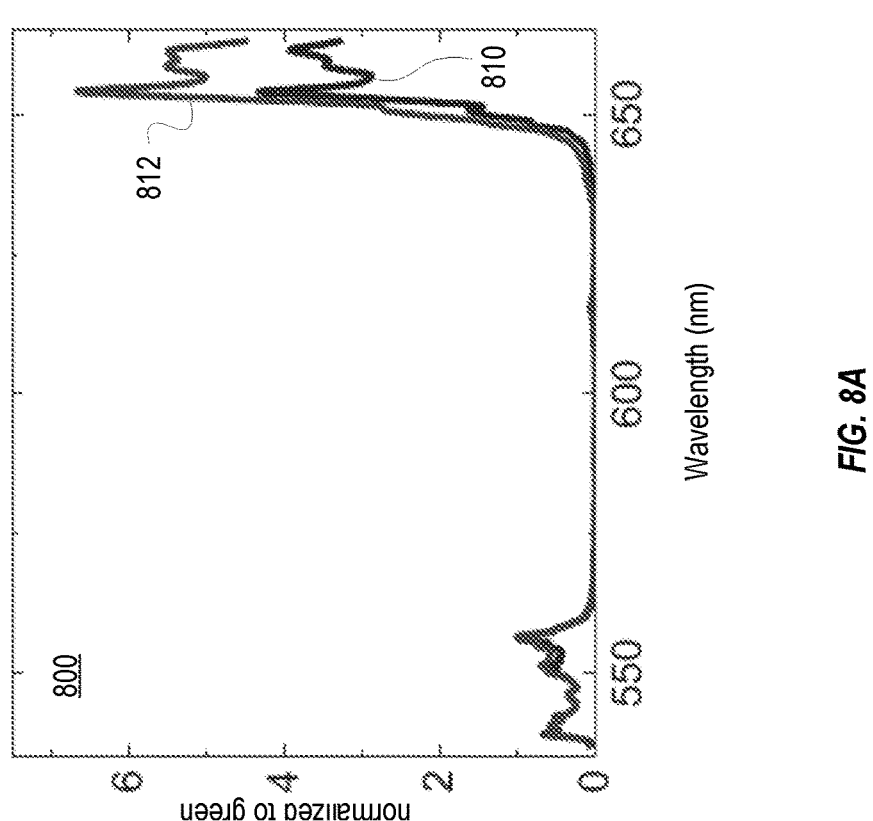
Figure 9:
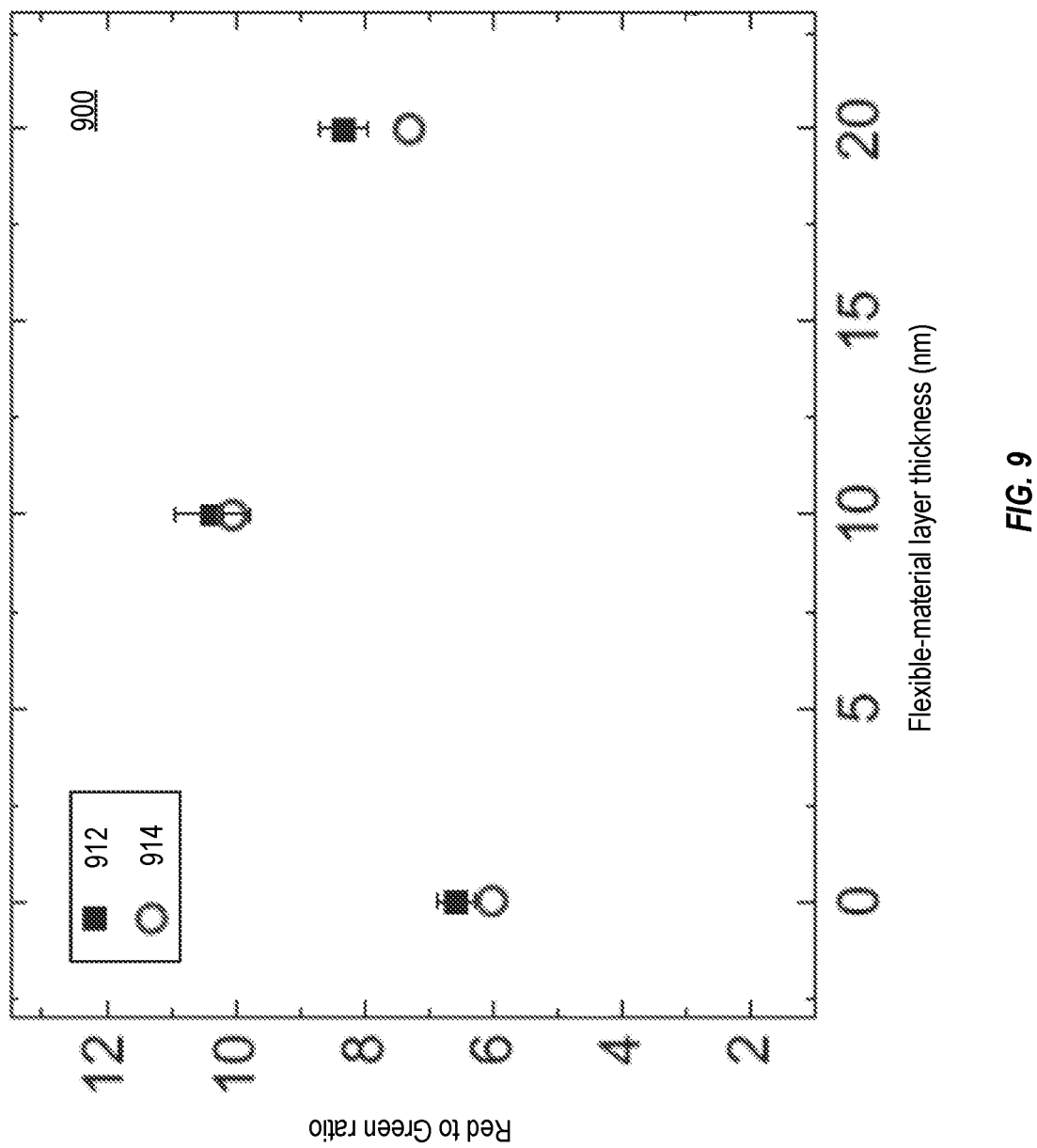

FIGS. 8A, 8B, and 9 are plots 800, 802, and 900, respectively, showing measurement results of the sample nanosensors. The measured PL results are normalized to green (i.e., 556.4 nm) to highlight the changes in the R/G ratio in the plots 800 and 802. The plot 800 shows PL intensity as a function of the emission wavelength and includes traces 810 and 812. The traces 810 and 812 are measured PL intensity traces for the sample nanosensor configurations (i) and (ii), respectively. The trace 810 for configuration (i) without a gold nanodisk show an R/G ratio of 4.4 in the red emission range. In contrast, the trace 812 for configuration (ii), which include a gold nanodisk but without an ITO layer, shows an R/G ratio of up to 6.6 in the red emission range. The plot 800, therefore, confirms the plasmon enhancement of the red PL emission by having the gold nanodisk. The measured enhancement factor for the R/G ratio of 1.5 agrees well with simulations.

The plot 802 shows the PL intensity as a function of the emission wavelength and includes traces 820, 822, and 824. The traces 820, 822, and 824 are the measured PL intensity traces for the sample nanosensor configurations (iii), (iv), and (v), respectively. The trace 820 for configuration (iii) on a 20-nm thick ITO layer but without a gold nanodisk shows the R/G ratio to be smaller than those of UCNPs on the $SiO_2$ substrate shown in the plot 800 because the sputtered ITO layer has a stronger absorption in the red wavelengths than in the green. However, the traces 822 and 824 for the respective configurations (iv) and (v), both of which have the addition of gold nanodisks with plasmon resonance at 654 nm, show a significant increase in the red photoluminescent intensity. The trace 824 with a 20-nm thick ITO layer shows the R/G ratio lower than that shown for the trace 822 with a 10-nm thick ITO layer because the plasmonic resonance with the 20-nm thick ITO layer is both weaker and red-shifted away from the emission wavelength, resulting in a lower PL enhancement at 654 nm. A small contribution from a greater ITO absorption in the red due to the larger thickness may also contribute to the lower R/G ratio.

In FIG. 9, the plot 900 compares the R/G ratios calculated from the simulated Purcell factors and the measured R/G ratios as a function of the ITO layer thickness. For thicknesses of 0 nm, 10 nm, and 20 nm, the sample nanosensor configurations (i), (iv), and (v) were used, respectively. Simulated R/G ratios 914 were calculated by multiplying the simulated Purcell factors to the measured PL intensities of a reference sample, where the reference sample was the sample nanosensor with configuration (i). Measured ratios 912 show the R/G ratios for sample configurations (iv) and (v). The plot 900 shows an excellent agreement between the experimental results and the predicted values from simulations.

When using nanosensors in animal applications, optical transmission of host skin may need to be considered. The optical transmission may be directly measured by spectroscopy. Alternatively, the optical transmission may also be measured by measuring the luminescence signal from free UCNPs (e.g., nanosensors without gold nanodisk) injected subcutaneously. The measured skin transmission may then be used to calibrate the signal obtained from nanosensors.

Figure 10B:
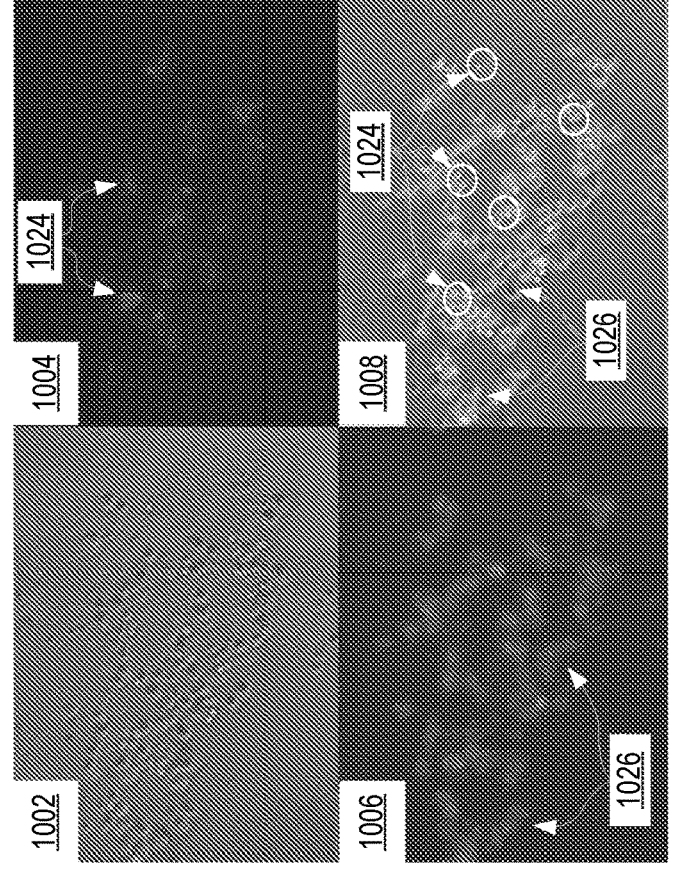
FIGS. 10A and 10B are images of nanoclusters comprising up-conversion nanoparticles with gold nanorods in lung cancer cells.
Figure 10A:
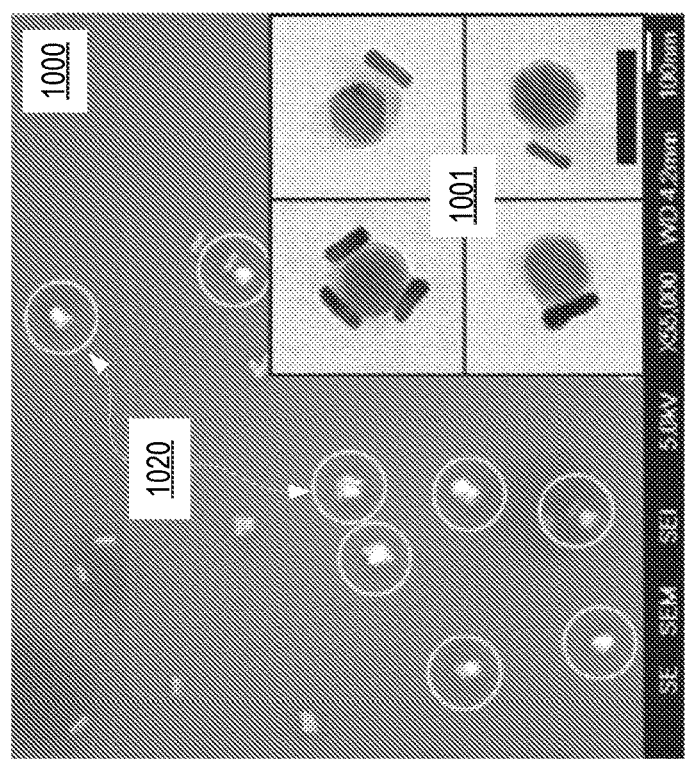

Additionally, UCNPs may be bio-conjugated with a protein found in living cells. As an example, FIGS. 10A and 10B are images of nanoclusters 1020 comprising UCNPs with gold nanorods (AuNR) in lung cancer cells. In FIG. 10A, image 1000 was taken with a scanning electron microscope (SEM) and shows nanoclusters 1020. Inset images 1001 were taken with a transmission electron microscope (TEM) and show the nanoclusters 1020 in detail. The UCNPs were conjugated with anti-epidermal growth factor receptor (EGFR) antibody, demonstrating specific targeting of EGFR expressing cells. A synthesis process was developed for the nanoclusters using functionalized poly (ethylene glycol) (PEG) linkers. Selective binding and cell targeting were conducted using a mixture of EGFR-positive (A549) and EGFR-negative (H520) lung cancer cells. To distinguish EGFR-positive and EGFR-negative cells by standard fluorescence microscopy, EGFR-negative cells were developed by transducing NucLight Red lentivirus while the UCNP-AuNR nanoclusters were further conjugated with DyLight labelled secondary antibody against immunoglobulin G (IgG) in addition to anti-EGFR antibody. This allows EGFR-positive and negative cells to be readily distinguished by their green and red fluorescence, respectively.

Image 1002 in FIG. 10B shows a brightfield image of a random mixture of A549 and H520 cells. Under 588 nm excitation, the nuclei of the H520 (EGFR-negative) cells fluoresce in red, which are shown as light clusters 1024 in image 1004. In contrast, under 493-nm excitation light, EGFR-positive A549 cells exhibit green luminescence, which are shown as light clusters 1026 in image 1006. Image 1008 is an overlay of the images 1004 and 1006, which shows no overlap between red and green fluorescence, shown as the respective clusters 1024 and 1026. This example shows that the anti-EGFR conjugated UCNP-AuNR nanoclusters were bound only to the EGFR-positive cells and not to the EGFR-negative cells and represents in vivo situations where EGFR-positive cells are scattered along with EGFR-negative cells. Consequently, since the bio-conjugation process above is well-established 1-ethyl-3-(3-dimethylaminopropyl) carbodiimide hydrochloride (EDAC) reaction, similar process may allow for bio-conjugation of nanosensors with most proteins. Specific cell type may then be targeted by conjugating the nanosensors with appropriate antibodies, which allows measurements of local force on targeted cells only.

Combinations of Features

Features described above as well as those claimed below may be combined in various ways without departing from the scope hereof. The following enumerated examples illustrate some possible, non-limiting combinations.

(A1) A nanosensor for detecting a force includes a metal layer, a flexible-material layer and a photoluminescent material. The flexible-material layer is deposited on a top surface of the metal layer. The photoluminescent material is attached to or at least partially embedded in the flexible-material layer and configured to emit first photoluminescence when optically excited at an excitation wavelength. The first photoluminescence has a first wavelength different from the excitation wavelength. The first intensity of the first photoluminescence changes with a distance between the photoluminescent material and the metal layer, where the distance changes in response to the force acting on the flexible-material layer.

(A2) In the nanosensor denoted (A1), the photoluminescent material is configured to implement down-conversion such that the first wavelength is greater than the excitation wavelength.

(A3) In either of the nanosensors denoted (A1) and (A2), the photoluminescent material is configured to implement up-conversion such that the first wavelength is less than the excitation wavelength.

(A4) In any of the nanosensors denoted (A1)-(A3), the excitation wavelength is near-infrared.

(A5) In any of the nanosensors denoted (A1)-(A4), the photoluminescent material, when optically excited at the excitation wavelength, further emits second photoluminescence having a second wavelength different from the excitation wavelength and the first wavelength; and a ratio of the first intensity and a second intensity of the second photoluminescence changes with the distance between the photoluminescent material and the metal layer.

(A6) In the nanosensor denoted (A5), the first wavelength is red and the second wavelength is green.

(A7) In any of the nanosensors denoted (A1)-(A6), the force is a component of a force vector, the force being oriented normal to the top surface.

(A8) In any of the nanosensors denoted (A1)-(A7), the metal layer includes high-conductivity metal such that a plasmon resonance is produced at the top surface when optically excited at the excitation wavelength.

(A9) In any of the nanosensors denoted (A1)-(A8), the metal layer includes one or more of: gold, silver, copper, platinum, and aluminum.

(A10) In any of the nanosensors (A1)-(A9), the metal layer is shaped as a disk.

(A11) In any of the nanosensors denoted (A1)-(A10), the disk is encapsulated with an inert coating.

(A12) In any of the nanosensors denoted (A1)-(A11), the photoluminescent material includes a plurality of up-conversion nanoparticles.

(A13) In any of the nanosensors denoted (A1)-(A12), the flexible-material layer includes a polymer.

(B1) A force-sensing method includes optically exciting a photoluminescent material, measuring a first intensity of first photoluminescence emitted, and determining a force exerted. Said optically exciting includes exciting the photoluminescent material with excitation light at an excitation wavelength. The photoluminescent material is attached to, or at least partially embedded in, a flexible-material layer that is deposited on a top surface of a metal layer. Said measuring includes measuring the first intensity of the first photoluminescence emitted by the photoluminescent material, the first photoluminescence having a first wavelength that is different from the excitation wavelength. Said determining includes determining, based on the first intensity and an elasticity of the flexible material, the force exerted on the flexible material.

(B2) In the method denoted (B1), the method further includes measuring an excitation intensity of the excitation light. The method further includes calculating a ratio of the first intensity and the excitation intensity. Said determining is based on the ratio.

(B3) In either of the methods denoted (B1) and (B2), the method further includes generating the first photoluminescence by down-converting the excitation light.

(B4) In either of the methods denoted (B1) and (B2), the method further includes generating the first photoluminescence by up-converting the excitation light.

(B5) In any of the methods denoted (B1) (B4), the method further includes measuring a second intensity of second photoluminescence emitted by the photoluminescent material at a second wavelength different from the first wavelength. The method further includes calculating a ratio of the first intensity and the second intensity. Said determining is based on the ratio.

(B6) In the method denoted (B5), the method further includes generating the first photoluminescence and the second photoluminescence by up-converting the excitation light.

(B7) In the method denoted (B5), the method further includes generating the first photoluminescence and the second photoluminescence by down-converting the excitation light.

(B8) In any of the methods denoted (B1)-(B7), the excitation wavelength is near-infrared.

(B9) In any of the methods denoted (B1)-(B8), the method further includes exerting the force on the flexible-material layer.

(C1) A method for manufacturing a nanosensor includes depositing a metal layer on a silicon substrate, depositing a flexible-material layer on a top surface of the metal layer, and depositing a photoluminescent material on the flexible-material layer.

(C2) In the method denoted (C1), the method further includes one or more of: (i) selecting a metal of the metal layer, (ii) selecting geometrical dimensions of the metal layer, the geometrical dimensions including a thickness and surface dimensions, (iii) selecting the geometrical dimensions of the flexible-material layer, (iv) selecting a material for the photoluminescent material, and (v) selecting geometrical dimensions of the photoluminescent material. A plasmon main resonance wavelength is equal to a first wavelength of first photoluminescence emitted from the photoluminescent material. A second wavelength of second photoluminescence emitted from the photoluminescent material lies outside of a plasmon resonance operation spectrum.

(C3) In either of the methods denoted (C1) and (C2), said depositing the metal layer includes depositing a layer made of one or more of: gold, silver, copper, platinum, and aluminum.

(C4) In any of the methods denoted (C1)-(C3), the method further includes depositing an adhesive layer between the metal layer and the flexible-material layer.

(C5) In the method denoted (C4), said depositing the adhesive layer includes depositing an adhesive layer made of at least one of germanium, copper, titanium, chromium, and organosilanes.

(C6) In any of the methods denoted (C1)-(C5), said depositing the metal layer includes depositing a metal layer shaped as a disk.

(C7) In any of the methods denoted (C1)-(C6), said depositing the photoluminescent material includes depositing a material having a plurality of up-conversion nanoparticles.

(C8) In any of the methods denoted (C1)-(C7), said depositing the flexible-material layer includes depositing a polymer.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

The invention claimed is:

1. A nanosensor for detecting a force, comprising:
   a metal layer having a top surface and exhibits a surface plasmon resonance in response to incident light at an excitation wavelength;
   a flexible-material layer deposited on the top surface; and
   a photoluminescent material attached to or at least partially embedded in the flexible-material layer and configured to emit, at a first intensity enhanced by the surface plasmon resonance, first photoluminescence when optically excited at the excitation wavelength, the first photoluminescence having a first wavelength different from the excitation wavelength;
   wherein the first intensity is a function of a distance between the photoluminescent material and the metal layer, the distance changing in response to the force acting on the flexible-material layer.

2. The nanosensor of claim 1, wherein the photoluminescent material is configured to implement down-conversion such that the first wavelength is greater than the excitation wavelength.

3. The nanosensor of claim 1, wherein the photoluminescent material is configured to implement up-conversion such that the first wavelength is less than the excitation wavelength.

4. The nanosensor of claim 1, the excitation wavelength being near-infrared.

5. The nanosensor of claim 1, wherein:
   the photoluminescent material, when optically excited at the excitation wavelength, further emits, at a second intensity, second photoluminescence having a second wavelength different from the excitation wavelength and the first wavelength; and
   a ratio of the first intensity and the second intensity is a function of the distance between the photoluminescent material and the metal layer.

6. The nanosensor of claim 5, wherein the first wavelength is red and the second wavelength is green.

7. The nanosensor of claim 1, wherein the force is a component of a force vector, the force being oriented normal to the top surface.

8. The nanosensor of claim 1, the metal layer comprising one or more of: gold, silver, copper, platinum, and aluminum.

9. The nanosensor of claim 1, the metal layer being shaped as a disk.

10. The nanosensor of claim 1, the metal layer being encapsulated with an inert coating.

11. The nanosensor of claim 1, the photoluminescent material comprising a plurality of up-conversion nanoparticles.

12. The nanosensor of claim 1, the flexible-material layer comprising a polymer.

13. A force-sensing method, comprising:
   optically exciting, with excitation light at an excitation wavelength, (i) a surface plasmon resonance at a top surface of a metal layer and (ii) a photoluminescent material attached to or at least partially embedded in a flexible-material layer that is deposited on the top surface;
   measuring a first intensity of first photoluminescence emitted by the photoluminescent material at a first wavelength different from the excitation wavelength; and
   determining, based on the first intensity and an elasticity of the flexible-material layer, a force exerted on the flexible-material layer.

14. The force-sensing method of claim 13, further comprising:
   measuring an excitation intensity of the excitation light; and
   calculating a ratio of the first intensity and the excitation intensity;
   wherein said determining is based on the ratio.

15. The force-sensing method of claim 13, further comprising generating the first photoluminescence by down-converting the excitation light.

16. The force-sensing method of claim 13, further comprising generating the first photoluminescence by up-converting the excitation light.

17. The force-sensing method of claim 13, further comprising:

measuring a second intensity of second photoluminescence emitted by the photoluminescent material at a second wavelength different from the first wavelength; and calculating a ratio of the first intensity and the second intensity;

wherein said determining is based on the ratio.

18. The force-sensing method of claim 17, further comprising generating the first photoluminescence and the second photoluminescence by up-converting the excitation light.

19. The force-sensing method of claim 17, further comprising generating the first photoluminescence and the second photoluminescence by down-converting the excitation light.

\* \* \* \* \*